United States Patent [19]
Cole, Jr.

[11] 3,951,845
[45] Apr. 20, 1976

[54] NEMATIC LIQUID CRYSTAL MIXTURES HAVING HOMOGENEOUS BOUNDARY CONDITIONS AND METHOD OF MAKING THE SAME

[75] Inventor: Herbert S. Cole, Jr., Scotia, N.Y.

[73] Assignee: General Electric Company, Schenectady, N.Y.

[22] Filed: July 16, 1973

[21] Appl. No.: 379,723

Related U.S. Application Data

[63] Continuation of Ser. No. 265,792, June 23, 1972, abandoned.

[52] U.S. Cl. ............................... 252/299; 252/408; 350/150; 350/160 LC
[51] Int. Cl.² ............................................. G02F 1/16
[58] Field of Search ............................. 252/408, 299; 350/160 LC, 150

[56] References Cited
UNITED STATES PATENTS

| | | | |
|---|---|---|---|
| 3,697,150 | 10/1972 | Wysocki | 350/150 |
| 3,803,050 | 4/1974 | Haas et al. | 252/408 |
| 3,809,456 | 5/1974 | Goldmacher et al. | 350/160 LC |
| 3,838,059 | 9/1974 | Wong | 252/299 |

*Primary Examiner*—Richard D. Lovering
*Assistant Examiner*—T. S. Gron
*Attorney, Agent, or Firm*—Daniel R. Levinson; Joseph T. Cohen; Jerome C. Squillaro

[57] ABSTRACT

Nematic liquid crystal mixtures characterized by a homogeneous boundary condition are prepared by the addition of soluble compounds having at least two polar groups to nematic liquid crystals of either positive or negative dielectric anisotropy. Between approximately 0.5 and 5 percent by weight of compounds such as dicarboxylic acids, aliphatic diamines, aliphatic dinitriles, diols, polyalkylene glycol, alkanol amines, e.g., ethanolamine, diethanolamine, triethanolamine and diethylene triamine, for example, when dissolved in a nematic material produce spontaneous homogeneous boundary conditions therein.

19 Claims, 3 Drawing Figures

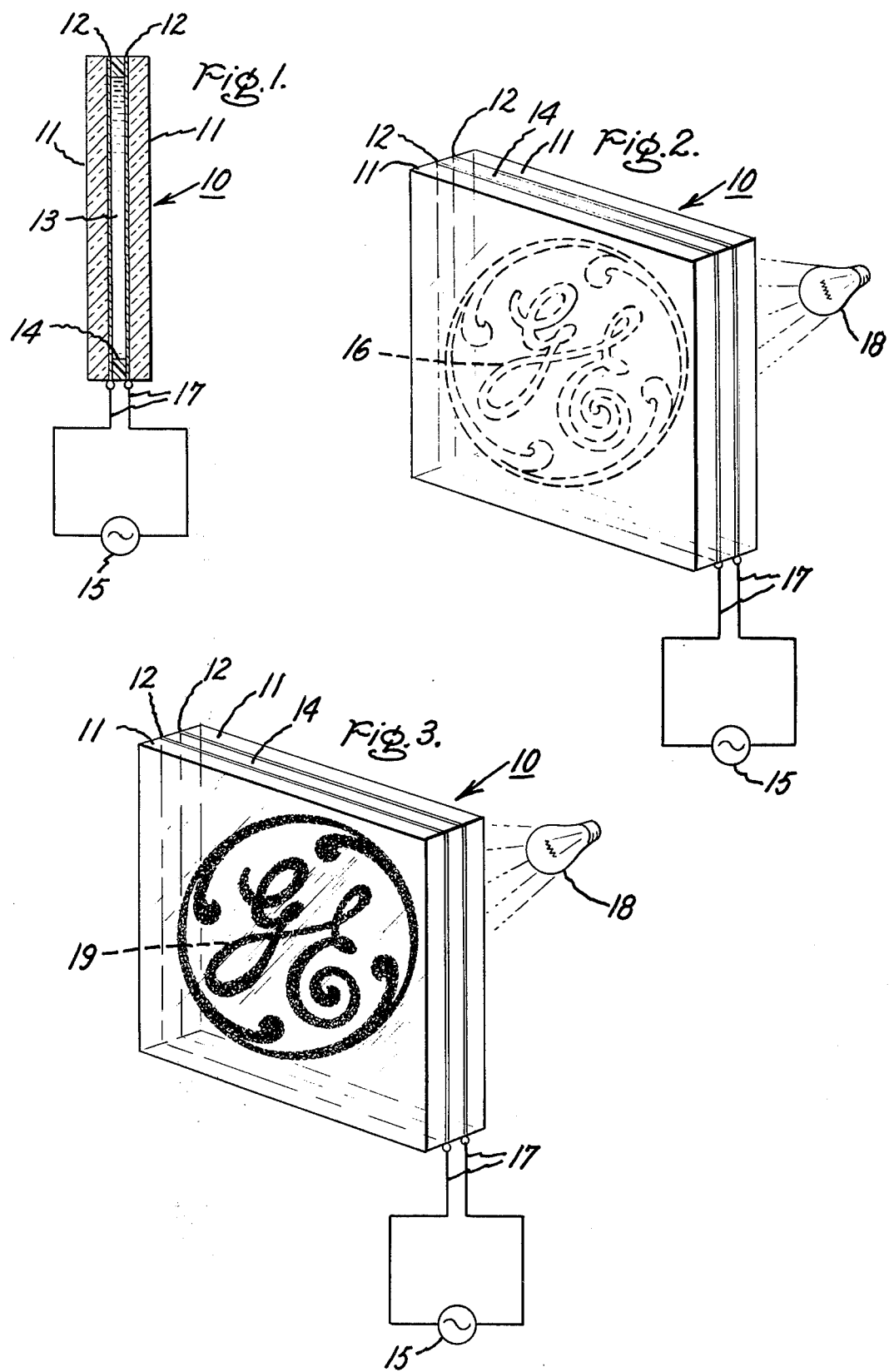

NEMATIC LIQUID CRYSTAL MIXTURES HAVING HOMOGENEOUS BOUNDARY CONDITIONS AND METHOD OF MAKING THE SAME

This is a continuation, of application Ser. No. 265,792, filed June 23, 1972, now abandoned.

The present invention relates to liquid crystals and more particularly to nematic liquid crystals having controllable optical properties. This application relates to concurrently filed application Ser. No. 265,794 of common assignee, now abandoned, the entire disclosure of which is incorporated herein by reference thereto.

Nematic liquid crystals are a class of materials which exhibit properties of both solid and liquid state over a substantial temperature range just above the melting point of the solid materials. Above the upper limit of this temperature range, nematic liquid crystal materials exhibit properties of an isotropic liquid and below the temperature range the materials exhibit properties of solid crystals. Within the temperature range, the materials are said to be in a mesophase.

One of the features which distinguishes nematic liquid crystals in the mesophase from isotropic fluids is a hazy or milky appearance of a thin layer of nematic liquid when mounted between two substrates, such as glass. Whereas isotropic fluids appear uniformly transparent, nematic materials adopt characteristic patterns known as textures which produce the hazy appearance. The various textures result from the relative alignment of the liquid crystal molecules with respect to the substrates. A small sample of material, for example, inspected under a microscope may reveal the presence of more than one texture.

In general, molecules of nematogenic substances have a cylindrical shape. In the mesophase, the molecules align themselves in a common direction (the nematic director) with their long axis parallel. A region with the same nematic director may comprise tens of thousands of molecules. A macroscopic sample, e.g., a drop of liquid crystal, contains many regions with different nematic directors. All molecules in a macroscopic sample can be oriented in the same direction, i.e., a single "crystal" can be produced, by application of magnetic or electric fields. In the field-free condition, however, even microscopic samples exhibit numerous regions with different nematic directors. Hence, when placed between glass substrates, for example, the liquid crystal appears to be slightly hazy or cloudy. This cloudiness arises from the random molecular alignment of the nematic directors. If the nematic directors could be aligned parallel to the surface of the substrates, for example, the nematic liquid would appear optically clear.

Prior art methods for alignment of nematic directors with their long axes parallel to a substrate involved rubbing both substrate surfaces in a common direction, as is described by P. Chatelain in the Bull Soc. Franc. Mineral Crist. 66, 105-130 (1943). The mechanism responsible for this effect is not well understood. It is postulated that traces of the material employed for rubbing remain on the surface and act as "nuclei" for alignment. Alignment in the bulk of the nematic mesophase is then achieved by cooperative effects from the rubbed surface. The resulting parallel alignment of nematic directors produces what is called a homogeneous condition in the liquid crystal.

Another condition, called homeotropic, is alignment of the nematic directors perpendicular to the substrate. When viewed in convergent light in a polarizing microscope, samples exhibit the conoscopic figure of a cross characteristic of positive uniaxial crystals. The aforementioned copending application relates to a novel method for producing homeotropic boundary conditions in nematic liquid crystal compositions.

Thin layers of nematic material in either the homogeneous or homeotropic condition do not scatter light over large angles and therefore appear substantially transparent. Nematic materials exhibiting either of these conditions are therefore preferred for display purposes where a high contrast ratio between the unactivated condition and the activated condition are desired. Unfortunately, both of these boundary conditions form spontaneously and randomly when liquid crystal material is spread on a substrate or sandwiched between two substrates. Accordingly, it has been very difficult to achieve uniformity over areas larger than microscopic dimensions by simply relying on spontaneous formation.

As pointed out above, negative anisotropic nematic liquid crystals having a homogeneous boundary condition are substantially transparent in the absence of an electric field. However, when subjected to a D.C., or low frequency alternating current field of sufficient magnitude, applied perpendicular to the substrate containing the liquid crystal, the substantially parallel alignment of the nematic directors is upset and a turbulent condition exists in which light incident on the substrates is scattered. Under the influence of high frequency A.C. fields, homogeneous layers of nematic liquid crystals become as transparent as in the field-free condition. As used herein, the term high frequency refers to the regime of frequencies in which no turbulence is produced at comparable voltage to the condition where turbulence is produced. This characteristic of homogeneous layers of nematic liquid crystals makes them particularly useful for display applications.

It is, therefore, an object of this invention to provide nematic liquid crystal materials with homogeneous boundary conditions.

It is yet another object of this invention to provide nematic liquid crystals which are substantially opaque when subjected to a D.C. or low frequency alternating current field of sufficient magnitude applied to the liquid crystal composition and substantially transparent in the absence of an electric field or in the presence of a high frequency alternating current field.

It is still a further object of this invention to alter the boundary conditions of nematic liquid crystals by dissolving in the nematic liquids additives having at least two polar groups.

It is yet another object of this invention to provide nematic liquid crystal display devices which are substantially transparent in the absence of an electric field and at high frequency alternating current fields and substantially opaque in the presence of D.C. or low frequency electric fields.

It is yet another object of this invention to provide nematic liquid crystal materials with a homogeneous boundary condition wherein said nematic materials have either a positive or negative dielectric anisotropy.

The foregoing objects and others are accomplished in accord with my invention by the addition of soluble compounds having at least two polar groups, one group at each end of the compounds, to nematic liquid crystal materials. The compounds are characterized by a substantially straight chain organic radical containing from 1 to about 12 carbon atoms between said end polar groups. Suitable compounds which produce the desired homogeneous boundary condition in the nematic liquid crystal are dicarboxylic acids, diamines, dinitriles, diols, aliphatic dipolar ethers and polyalkylene glycols, for example. These compounds, when dissolved in nematic liquid crystals in concentrations of between approximately 0.5 and 5 percent by weight, for example, permit the fabrication of large area (e.g., 50 square inches or more) display devices which are substantially transparent in the field-free condition and the high frequency field condition and are substantially opaque in the D.C. or low frequency field condition.

A better understanding of my invention as well as other objects and further advantages thereof will become more apparent to those skilled in the art from the following detailed description, taken in conjunction with the accompanying drawings in which:

FIG. 1 is a cross-sectional view of a liquid crystal display cell;

FIG. 2 is an isometric view of an embodiment of a liquid crystal display cell wherein the desired image to be formed is illustrated in outline form; and FIG. 3 is an isometric view of an embodiment of my invention wherein the desired image is defined by the shaded area.

FIG. 1 illustrates a liquid crystal display cell 10 comprising a pair of spaced planar substrates 11 such as glass plates, with transparent electrodes 12 along the inner faces of the substrates 11. A nematic liquid crystal composition 13, such as N-(p-methoxybenzylidene)-p-(n-butyl)-aniline (MBBA), for example, (where the net dielectric anisotropy, $\Delta\epsilon$, is less than zero and $\Delta\epsilon = \epsilon_{11} - \epsilon_{\perp}$, a characteristic of dynamic scattering materials) is contained within the substrates 11 by a spacer and sealing gasket 14. In general, the spacing between the substrates may vary between approximately 5 and 150 microns.

FIG. 2 illustrates an isometric view of an embodiment of my invention wherein the desired image to be formed in the liquid crystal display cell 10 is illustrated in outline form and referred to by the numeral 16. Since this desired image is formed in the substantially transparent conductive coating 12, it is not readily visible in the presence of a light source 18. In the absence of an electric field, the liquid crystal display cell appears substantially transparent where it is to be employed in the light transmissive mode and would appear to provide a mirror surface if the display cell is to be operated in a light reflective mode.

FIG. 3 illustrates the display cell 10 with a suitable electric field applied across the nematic liquid crystal such that turbulence is produced in the liquid crystal in the region 19 of the applied electric field and hence light scattering occurs.

Operationally, in the absence of an electric field, i.e., an unexcited condition, the display advantageously should appear substantially transparent, whereas in the excited (applied field) condition the liquid crystal is rendered substantially opaque in the regions of the applied field and hence scatters light incident thereon. An image thus formed in the regions of the transparent conductive coatings 12 appears as an opaque or frosted area 19 in the display cell.

Other nematic liquid crystal materials which are also useful in the practice of my invention are materials having a positive anisotropy. An example of this class of materials is p-ethoxybenzilidene-aminobenzonitrile. These materials tend to align in the direction of an applied electric field, either A.C. or D.C. Characteristics of the so-called "field effect" displays employing positive anisotropy materials are more fully described by M. Schadt and W. Helfrich, Applied Physics Letters 18, 127 (1971).

As pointed out above, one of the particularly troublesome problems encountered in the fabrication of liquid crystal display devices has been the inability to obtain nematic materials which in the unactivated condition are substantially transparent (for negative anisotropic materials) and in addition, of uniform molecular alignment for positive anisotropic materials. Most nematic liquid crystal materials are hazy or cloudy in appearance even when used in thin layers between glass substrates, for example. The cloudiness or haziness reduces the ratio of the light scattered in the activated condition to the light scattered in the unactivated condition and hence produces contrast ratios which are not entirely acceptable for display applications.

Also, for field-effect displays a uniformly appearing surface is desired since a random molecular alignment produces a less desirable display.

In accord with my invention, I have found that homogeneous boundary conditions are spontaneously produced in nematic liquid crystals by dissolving therein effective amounts of a compound having at least two polar groups one at each end of the compound. Those skilled in the art can readily appreciate the numerous advantages flowing from this discovery. For example, the cloudiness or haziness customarily characteristic of liquid crystal display devices employing negative anisotropic materials, for example, is substantially reduced and hence the ratio of light scattered in the activated condition to light scattered in the unactivated condition is substantially improved. Also, for positive anisotropic materials, the addition of my novel additives produces a more uniformly appearing display, for example, where a "twisted nematic" display is desired, such as is described by Schadt and Helfrich. Still other advantages of my invention will become more apparent from the following description.

Examples of additives which produce a homogeneous boundary condition in nematic liquid crystals include dicarboxylic acids having a chemical formula of $$HO_2C-(CH_2)_n-CO_2H$$

where $n$ varies from 1 through 11; diamines having a formula $$H_2N-(CH_2)_n-NH_2$$

where $n$ varies from 2 through 12; dinitriles having a formula $$NC-(CH_2)_n-CN$$

where $n$ varies from 1 through 6; diols having a formula of $$HO-(CH_2)_n-OH$$

where $n$ varies from 2 through 12; and polyalkylene glycols having a formula of

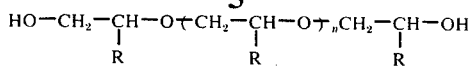

where n equals 3 and R equals H or lower alkyls, preferably methyl.

In addition to the foregoing additives, aliphatic amines, such as alkanolamines including ethanolamine having a chemical formula of $$H_2N-CH_2-CH_2-OH$$

and diethanolamine having a chemical formula of $$(HO-CH_2-CH_2)_2NH,$$

are also useful. Also, an alkylenepolyamine such as diethylenetriamine having a chemical formula of $$H_2N-CH_2-CH_2-NH-CH_2-CH_2-NH_2$$

is also a useful aliphatic amine additive which produces homogeneous boundary conditions in nematic liquid crystal compositions.

Also, oxydipropionitrile having a chemical formula of $$NC-CH_2-CH_2-O-CH_2-CH_2-CN$$

and oxydibutyronitrile having a chemical formula of $$NC-(CH_2)_3-O-(CH_2)_3-CN$$

produce homogeneous boundary conditions in nematic liquid crystals.

Still another additive which produces the desired homogeneous boundary conditions is 11 - Bromo - Δ 10 - undecylenic acid having a chemical formula

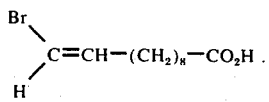

Those skilled in the art will also appreciate that still other additives may be employed. For example, additives having a formula $$R-(CH_2)_n-R'$$

where R and R' = CN and n is greater than 6 may also be employed. Similarly, with R and R' = NH$_2$, n may be greater than 12, etc. Additionally, it should be understood that different polar groups R and R' may be employed, such as, for example, the ethanol amine described above.

The foregoing additives are dissolved in the liquid crystal in amounts effective to produce the desired homogeneous boundary condition; generally, between approximately 0.5 and 5 percent by weight is sufficient. Where desired, the dissolution may be achieved by raising the temperature of the mixture above the nematic-isotropic transition temperature. Generally, however, even where heating is required, dissolution occurs within one to thirty minutes.

With regard to the concentration of these additives, concentrations less than 0.5 percent by weight may be employed, if desired, but the minimum useful concentration is ultimately limited by failure to produce the desired homogeneous boundary conditions. Concentrations of these additives higher than 5 percent may also be employed, however higher concentrations increase the conductivity of the liquid crystal undesirably or may not be totally dissolved in the liquid crystal. Hence, the preferred range of between approximately 0.5 and 5 percent by weight of the dipolar molecular additive is most useful in practicing our invention. In general, within this range of concentrations, it is desirable to use only that amount which is required to produce the desired results. Generally, 1 to 2 percent of the additive is sufficient to produce the desired homogeneous boundary condition.

It should also be noted that various nematic liquid crystals may be employed in the practice of our invention. For example, the materials listed in U.S. Pat. Nos. 3,322,485 - Williams and 3,499,702 - Goldmacher et al are exemplary of other useful materials.

A qualitative analysis of the improvement obtained by the addition of these additives to nematic liquid crystal composition has shown an improvement in transmissivity of from about 67 percent for nematic liquid crystal displays without the additive to approximately 74 percent for those displays including the additives. I have also found that still further aesthetic improvement is obtained if the planar substrates are rubbed in a uniform direction with a soft cloth moistened with a low boiling point solvent, such as methyl ethyl ketone. More specifically, where the substrates are uniformly rubbed prior to being sealed, I have found that while the transmissivity of the display cell is substantially similar to the unrubbed cell, the display cell exhibits a more nearly uniform appearance.

The foregoing transmission characteristics were obtained by measuring a 12° cone of light transmitted through a display cell, such as illustrated in FIG. 1. A photodetector was employed to record the transmitted light intensity. Calibration of the photodetector at the 0 and 100 percent levels was performed in the absence of the display cell.

As pointed out above, the mechanism responsible for nematic director alignment as a result of rubbing the substrates is not understood. However, it does appear to provide some degree of aesthetic improvement in liquid crystal display cells even where these additives have been dissolved in the nematic liquid crystals. Accordingly, while rubbing of the substrate surfaces in a uniform direction is not essential to the practice of my invention, where desirable for aesthetic or other reasons, it may be employed in conjunction with the addition of the additives.

Another particularly desirable feature of liquid crystal display devices when constructed with nematic liquid crystals of negative anisotropy doped with these additives is the response to high frequency A.C. fields. Since the appearance of a liquid crystal display constructed in accord with our invention would appear substantially transparent in both the field-free condition and in the high frequency field condition, the liquid crystal composition is particularly useful for frequency responsive applications, such as is disclosed in copending application Ser. No. 139,675 filed May 3, 1971, and of common assignee as the instant application.

Without limiting my invention to any particular theory of operation, I believe the ability to obtain spontaneous homogeneous alignment of nematic liquid crystal molecules is a result of polar alignment of the molecules dissolved in the liquid crystal. More specifically, the substrates employed in the fabrication of liquid crystal devices generally include glass, glass coated with tin oxide, aluminum or chromium, for example. These substrates are more polar than the nematic liquid crystal material. Hence, where compounds having at least two polar groups are dissolved in the liquid crystal composition it is believed the polar molecules become attracted to the polar substrate. The carbon chain, for example, intermediate the polar groups then lies parallel to the substrate and hence promotes cooperative alignment of the liquid crystal molecules in the same manner.

The foregoing theory by which homogeneous molecular alignment is achieved is compatible with observations made of various additives to nematic liquid crystals. For example, the addition of glutaric acid in a concentration of one percent by weight to a nematic liquid crystal such as MBBA produces a homogeneous boundary condition therein. Glutaric acid is an aliphatic dipolar molecule having the general formula

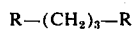

$R-(CH_2)_3-R$ where R equals COOH. The chain lengths, i.e., the number of $CH_2$ groups may vary, such that other dicarboxylic acids are used. Nonetheless the polar end groups attach themselves to the substrate and by cooperative alignment produce the homogeneous boundary condition in the nematic liquid crystal.

It has also been observed that non-polar additives, such as n-octane and n-hexadecane, have no effect on the molecular orientation of nematic liquid crystals. Further, monopolar additives, such as benzoic acid, do not produce the desired homogeneous boundary conditions. Also, even dipolar additives which are insoluble or substantially insoluble in the nematic liquid crystal compositions do not produce the desired homogeneous boundary conditions. Examples of dipolar additives which are not soluble or substantially soluble in the nematic liquid crystal compositions are terephthalic acid, methylene dianiline, p-amino phenethyl alcohol, fumaric acid, maleic acid and 6-amino caproic acid. Accordingly, in practicing my invention homogeneous boundary conditions are produced in nematic liquid crystals by the addition of compounds having at least two polar groups and characterized by their substantial solubility in the nematic liquid crystal material.

In order that those skilled in the art may better understand my invention, the following examples are given by way of illustration and not by way of limitation. In all of the examples parts are by weight and temperatures are in degress Celsius unless otherwise stated.

EXAMPLE 1

One hundred grams of MBBA is mixed with one gram 1,5-dicyanopentane. The mixture is heated to a temperature of approximately 60° for approximately 5 minutes to dissolve the dicyanopentane into the MBBA. The mixture is then allowed to cool to room temperature. Glass substrates having appropriate patterns etched in stannic dioxide are cleaned and air dried. The glass substrates are sealed along the perimeter thereof with a spacing of approximately 12 microns therebetween. The resulting cell is filled with the liquid crystal mixture through a small aperture in the glass (with a second aperture providing escape for the gases) and the apertures are then sealed. The resultant cell with the nematic liquid crystal mixture contained therein exhibits a homogeneous boundary condition. An electric field of approximately $10^4$ volts per centimeter applied across the liquid crystal mixture produces a sufficient contrast ratio for display purposes.

EXAMPLE 2

In a similar manner a display device is constructed as described in Example 1, but before sealing the glass plates together, the glass plates are rubbed in a uniform direction with a soft cloth moistened with a low boiling point solvent, such as methyl ethyl ketone. The plates are then air dried and the cell sealed and filled in the manner described above. The display cell exhibits the same transparency but provides a more uniformly appearing display. No appreciable difference is noticed in contrast ratio or operating parameters.

EXAMPLE 3

One gram of 1,6-hexane diamine is dissolved in 100 grams of a nematic liquid crystal composition of the E. Merck Company, Darmstadt, Germany, identified as Nematic Phase IV, by heating the mixture slightly above 76°C. to cause dissolution of the 1,6-hexane diamine in the liquid crystal. The mixture is then allowed to cool to room temperature and is introduced into a liquid crystal display cell in which the glass substrates were uniformly rubbed with a soft cloth moistened with methyl ethyl ketone prior to sealing. The spacing between the substrates is 12 microns. The liquid crystal mixture is then introduced into the space between the glass substrates as in Example 1. The resultant display device exhibits a transparency of approximately 75 percent in the unactivated or no-field condition.

EXAMPLE 4

0.5 grams of ethanolamine is added to 100 grams of MBBA. The mixture is heated to 60°C. for five minutes and then cooled to room temperature. Glass substrates, one coated with $SnO_2$ and one coated with aluminum having a layer of silicon oxide thereover are rubbed in a uniform direction, sealed and filled with the liquid crystal mixture as described in Example 3 to produce a liquid crystal display cell exhibiting a homogeneous boundary condition. The display appears substantially transparent in the unactivated condition.

EXAMPLE 5

The display device of Example 4, having desired patterns formed in the conductive coatings is coincidence addressed with the simultaneous application of high and low frequencies. The unactivated and high frequency field areas appear substantially identical.

EXAMPLE 6

2.0 grams dicyanopentane, 50 grams of MBBA and 50 grams p-(ethoxybenzylidene)-p-(n-butyl) aniline (EBBA) are heated to 60° for 5 minutes. The mixture is introduced into a display cell as described in Example 3. The display appears substantially transparent in the unactivated condition and in the high frequency field condition.

EXAMPLE 7

1.0 gram of Carbowax 200 (trade name for polyethylene glycol, a product of the Union Carbide Chemical Company) and 100 grams of MBBA are heated to 60° for 5 minutes. The mixture is then used as described in Example 2.

Although the above examples have shown various modifications and variations of my invention, it is obvious that still other modifications and variations are possible and will be readily recognized by those skilled in the art. For example, other nematic liquid crystal compositions may be employed and still other configurations for display devices are possible. Also, both reflective and transmissive modes of operation may be employed, if desired. It is therefore to be understood that changes may be made in the particular embodiments of the invention described which fall within the full intended scope of the invention as defined by the appended claims.

What I claim as new and desire to secure by letters patent of the United States is:

1. A nematic liquid crystal mixture characterized by a homogeneous boundary condition when formed in a thin layer, said mixture comprising a nematic liquid crystal and between approximately 0.5 and 5 percent by weight of the mixture of a compound having at least two polar groups, one group at each end of the compound, said compound being characterized by a substantially straight chain organic radical containing from 1 to about 12 carbon atoms between said end polar groups and by a substantial solubility in the nematic liquid crystal, the molecules of said compound tending to align parallel to a boundary substrate and thereby produce said homogeneous boundary condition in said mixture.

2. The mixture of claim 1 wherein said compound is selected from the group consisting of dicarboxylic acids, aliphatic diamines, aliphatic dinitriles and diols.

3. The mixture of claim 1 wherein said compound is a polyalkylene glycol.

4. The mixture of claim 1 wherein said compound is an aliphatic amine selected from the group consisting of alkanolamines and alkylenepolyamines.

5. The mixture of claim 1 wherein said compound is 11-Bromo-Δ10-undecylenic acid.

6. The mixture of claim 1 wherein said nematic liquid crystal has either a positive or a negative dielectric anisotropy.

7. The mixture of claim 1 wherein said compound is 1,5-dicyanopentane.

8. The mixture of claim 1 wherein said mixture has a negative dielectric anisotropy and an approximately 10 to 100 micron thick layer of said mixture is characterized by substantially the same transmissivity in the absence of an electric field as in the presence of a high frequency field which does not produce any turbulence in said mixture.

9. The mixture of claim 1 producing a homogeneous boundary condition when placed between planar substrates spaced apart by approximately 6 to 150 microns.

10. A liquid crystal display device comprising a sealed display cell with a thin layer of a nematic liquid crystal mixture contained therein, said mixture comprising a nematic liquid crystal and between approximately 0.5 and 5 percent by weight of the mixture of a compound dissolved in said nematic liquid crystal which contains at least two polar groups, one at each end of the compound, said compound including a substantially straight chain organic radical containing from 1 to about 12 carbon atoms between said end polar groups, the molecules of said compound tending to align parallel to a substrate forming a boundary wall of said display cell and thereby produce a homogeneous boundary condition in said mixture.

11. The display device of claim 10 wherein said compound is selected from the group consisting of dicarboxylic acids, aliphatic diamines, aliphatic dinitriles and diols.

12. The liquid crystal display device of claim 10 wherein said display device is substantially transparent in the absence of an electric field and in the presence of a high frequency alternating current field.

13. The liquid crystal display device of claim 10 wherein said nematic liquid crystal has a net positive dielectric anisotropy.

14. A method of producing a homogeneous boundary condition in a nematic liquid crystal material, said method comprising mixing a soluble compound having at least one polar group at each end of the compound and a substantially straight chain organic radical containing from 1 to about 12 carbon atoms between said end polar groups into said nematic liquid crystal material in a concentration of between approximately 0.5 and 5 percent by weight, so as to produce said homogeneous boundary condition.

15. The method of claim 14 wherein the step of mixing is accomplished at an elevated temperature.

16. The method of claim 14 wherein said compound is selected from the group consisting of dicarboxylic acids, aliphatic diamines, aliphatic dinitriles and diols.

17. The method of claim 14 wherein said compound is selected from the group consisting of oxydipropionitrile, ethanolamine, diethanolamine, 1,5-dicyanopentane and 11-Bromo-Δ10-undecylenic acid.

18. In combination with a display device including a pair of closely spaced planar substrates with a nematic liquid crystal sealed in the space therebetween and means for applying an electric field to at least selected regions of said nematic liquid crystal, the improvement comprising the dissolution in said nematic liquid crystal of between approximately 0.5 and 5 percent by weight of the mixture of a compound having at least two polar groups, one at each end of the compound, said compound including a substantially straight chain organic radical containing from 1 to about 12 carbon atoms between said end polar groups, the molecules of said compound tending to align parallel to the adjacent surface of said spaced planar substrates, so as to cause said nematic liquid crystal to assume a homogeneous condition.

19. The combination of claim 18 wherein said compound is selected from the group consisting of dicarboxylic acids, aliphatic diamines, aliphatic dinitriles and diols.

* * * * *